United States Patent
Stempin et al.

[11] 4,116,703
[45] Sep. 26, 1978

[54] COMPOSITE FOAMABLE CEMENTS

[75] Inventors: John L. Stempin, Beaver Dams; Dale R. Wexell, Corning, both of N.Y.

[73] Assignee: Corning Glass Works, Corning, N.Y.

[21] Appl. No.: 838,088

[22] Filed: Sep. 30, 1977

[51] Int. Cl.$^2$ .............................................. C04B 7/02
[52] U.S. Cl. ....................................................... 106/75
[58] Field of Search .......................... 106/75, 76, 86, 87

[56] References Cited
U.S. PATENT DOCUMENTS

| 3,498,802 | 3/1970 | Bickford et al. | 106/74 |
| 3,663,249 | 5/1972 | Rao | 106/75 |
| 3,743,525 | 7/1973 | Farrauto et al. | 106/74 |
| 3,743,601 | 7/1973 | Rao | 106/75 |
| 3,832,195 | 8/1974 | Butler et al. | 106/84 |
| 3,844,804 | 10/1974 | Horai et al. | 106/75 |

Primary Examiner—J. Poer
Attorney, Agent, or Firm—Milton M. Peterson; Clinton S. Janes, Jr.; Clarence R. Patty, Jr.

[57] ABSTRACT

An inorganic cement mixture, capable of being thermally foamed in situ, consists essentially by weight of 8-20% of crystalline hydraulic cement, 22-35% of a hydraulic cement in the form of a glass powder, and 45-70% quaternary ammonium silicate solution. The mixture can be set as a cement and thermally foamed to unite two bodies and serve as a spacer and support to maintain them in spaced relation.

7 Claims, 1 Drawing Figure

U.S. Patent  Sept. 26, 1978  4,116,703
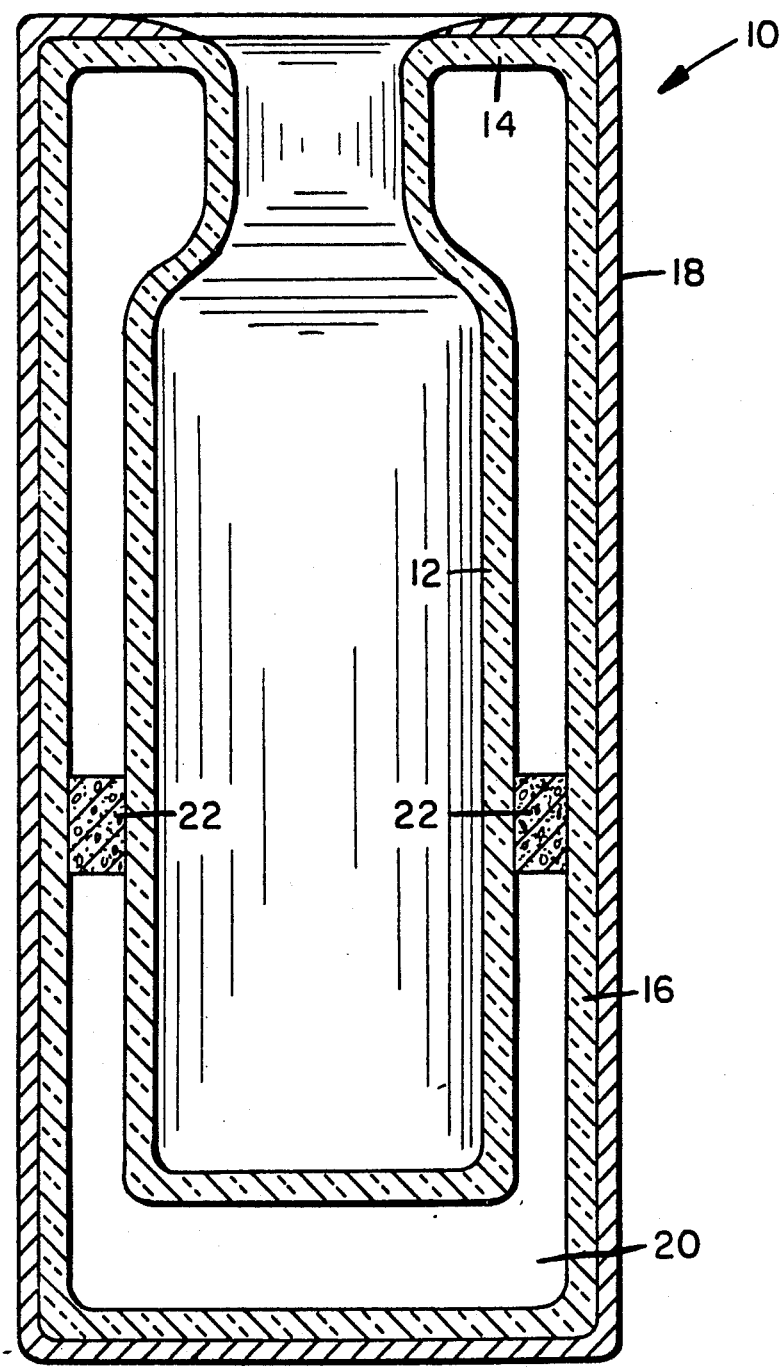

COMPOSITE FOAMABLE CEMENTS

BACKGROUND OF THE INVENTION

An hydraulic cement is well known as a material which, when mixed with water and allowed to stand, will gradually set up as a hard, solid mass. Among the crystalline cements, Portland cement is probably the best known and most widely used.

In spite of its widespread use, Portland cement has recognized shortcomings in the areas of chemical durability and compatibility with thermal change. For example, solid structures produced by setting Portland cement tend to deteriorate under conditions of either very high or very low humidity. Accordingly, it has been proposed to employ certain silicate glasses in powder form as hydraulic cements. However, these glasses have yet to provide a degree of improvement necessary to warrant their cost.

There is a substantial interest in foamed inorganic materials because of the recognized limitations of organic foams where mechanical strength, resistance to heat, and/or resistance to combustion are requisites. Nevertheless, the crystalline cements, including Portland cement, have found little application in this area of material development. Portland cement, for example, can be foamed during the early stages of curing, but generates a foam that tends to be friable. Furthermore, the loss of water in the foaming process causes the strength of the foam to diminish.

Foamed glass products have been available for some time. These are customarily produced by mixing a powdered glass, or glass precursor, with a gasifying agent such as carbon or a carbonaceous material, the agent and glass being adapted to produce a gas by chemical or physical action as the glass is thermally softened. This operation of course contemplates temperatures approaching the glass melting range.

As a lower temperature alternative, various procedures have been devised for producing inorganic foams from alkali metal silicates. The resulting silica foams have been very useful, but tend to have low mechanical strength and to rapidly degrade under extreme humidity conditions. Thus, such foams could not be recommended for use either in an evacuated environment or in moist or wet areas.

It is then a primary purpose of this invention to provide an improved inorganic cement mixture, particularly adapted to production of foamed material, and products produced therefrom.

PRIOR ART

U.S. Pat. No. 3,498,802, granted Mar. 3, 1970 to H. L. Bickford et al., describes the manufacture of thermoplastic materials and hydraulic cements by steam treatment of glass powders whose compositions are in the alkali metal silicate area. U.S. Pat. No. 3,720,527, granted Mar. 13, 1973 to R. J. Farrauto et al., describes fast setting cements based on glasses having $R_2O$—$SiO_2$—$P_2O_5$ compositions, while a companion patent, U.S. Pat. No. 3,743,525 granted July 3, 1973, describes cements with improved compressive strength, based on $R_2O$—$RO$—$SiO_2$ compositions and optionally containing a diacid phosphate anion. U.S. Pat. No. 3,832,195, granted Aug. 27, 1974 to M. F. Butler et al., describes a petalite-spodumene-potassium silicate cement for bonding metal to glass.

U.S. Pat. Nos. 3,663,249 and 3,743,601, granted May 16, 1972 and July 3, 1973, respectively, to R. P. Rao, describe typical procedures for making foams from alkali metal silicates. In the former, a mixture of dry silicate and insolubilizing agent is exposed to saturated steam and heated, while the latter discloses hydrating a dry silicate to the extent of 5–40% and then thermally foaming the hydrated silicate. U.S. Pat. No. 3,844,804, granted Oct. 29, 1974 to J. C. Harai et al., describes a silicate foam producing method wherein a material reactive with a silicate, such as phosphoric acid, is absorbed in an amorphous carrier and mixed with the silicate prior to thermal foaming.

U.S. Pat. Nos. 3,239,521 and 3,239,549, granted Mar. 8, 1966, and 3,248,237, granted Apr. 26, 1966, all granted to H. Weldes, describe generally the properties and preparation of quaternary ammonium silicates.

SUMMARY OF THE INVENTION

The invention provides an inorganic cement mixture which is capable of being thermally foamed and which consists essentially by weight of 8–20% crystalline hydraulic cement, 22–35% of a hydraulic cement in the form of a glass powder, and 45–70% quaternary ammonium silicate solution. It further provides a composite article comprising two component parts in spaced relationship and joined by a thermally expanded reaction product of the foamable cement mixture.

GENERAL DESCRIPTION

The present cement mixture is a combination in limited proportions of three materials, each of which is known as a cement or foamable material individually. However, as heretofore used individually, each has had certain shortcomings.

Foamed silicate materials, customarily produced from sodium or potassium silicates, are well known. A variety of insolubilizing agents has been proposed to separate the silica from the alkali. It has also been suggested to leach out the free alkali to improve durability. Nonetheless, it has been found that cements produced from aqueous alkali silicate solutions alone, whether foamed or unfoamed, tend to be friable and low in strength, non-uniform in foaming characteristics, and of poor chemical durability, particularly in the presence of water or caustic solutions.

However, an essential ingredient in our new mixtures is an aqueous silicate. In order to minimize the presence of free alkali, we find it preferable to use quaternary ammonium silicates. These are commercially available from Philadelphia Quartz Co., Valley Forge, Pa., and examples are described in the Weldes patents mentioned earlier.

In our mixtures, the aqueous solution of quaternary ammonium silicate serves two purposes. It supplies a polymerized form of silicate as described in detail later. It also provides water required for reaction with the glass powder to hydrate the glass, thus enabling control of both water content in the cement as set, and the rate of setting or curing. Finally, the quaternary cation form provides residual organic units on the foamed cement surface that tend to render it hydrophobic.

While cement mixtures containing aqueous silicates outside our limits will form cements, we find such cements of poor quality. Thus, with greater than 70% silicate the curing cycle must exceed 250° C. for one hour with slow heating to prevent excessive foaming. Further, properties are not substantially improved over those obtained with a 100% silicate material in accordance with prior practice. If less than 45% is employed, there is insufficient water and/or polymeric silicate to provide a homogeneous cement network with the glass and crystalline cements. Also, the mix tends to set very rapidly, and we prefer at least 55% to facilitate working with the mixture.

An hydraulic glass cement powder, as described in the Bickford et al. and Farrauto et al. patents above, is also an essential ingredient. We particularly prefer the fast setting glass powders disclosed in U.S. Pat. No. 3,720,527 which consist essentially of 15–85% $R_2O$, 10–80% $SiO_2$ and 3–20% $P_2O_5$ in percent by weight. At least 22% of such glass is required to provide the desired characteristics of the mixture. Over 35% tends to provide an undue amount of solids for adequate foaming and reduces resistance to extreme humidity conditions. Accordingly, we prefer no more than 30% for this reason.

It will be observed that the glasses are predominantly composed of alkali and silica, and hence might be regarded as analogous to the alkali silicates in behavior. However, such is not the case, and we find marked differences between the characteristics of the glasses and the characteristics of the crystalline silicates when each is foamed. While we have no positive proof, we ascribe this difference in behavior to the differences in physico-chemical arrangement of silicon in the materials. Thus, we believe the silicon exists primarily in a polymerized or chain form in a foamed cement produced from an aqueous silicate. In contrast, it is our belief that the silicon is in a typical randomly oriented pattern in the glasses. In the present glass-silicate mix then, we think silicon exists in both polymerized and glassy forms, and that the improved properties stem from such combination.

It should be noted that the presence of a phosphate component in the Farrauto et al. hydraulic glass cements permits polymerization of the surface of one glass particle to another glass particle via such bonding types as

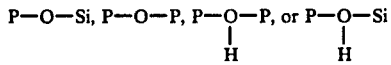

and hydrogen bonds. The rapid set of reactions which these glasses undergo in the presence of water produces a cement foam that is quite different in chemical structure from a simple alkali silicate glass foam or an aqueous polymer.

A further important factor is the presence of a crystalline cement. Incidentally, this may be in premixed form, the commercial product available under the mark SAKRETE having been used in experimental studies. This addition renders the foamed cement very hard and more resistant to weathering and dissolution in water.

As indicated earlier, Portland cement is the most widely available of the several crystalline cements. Commercial or premixed cements usually are predominantly Portland cement but may contain other varieties in varying amount. Hence, we refer generally to crystalline cement since no one species is usually available in pure form.

At least 8% crystalline cement is required to impart hardness and to render the cement resistant to weathering and total dissolution in water. With greater than 20%, the mix takes on the typical characteristics of a crystalline cement, that is difficult to foam, a long curing time, and a poor adhesion to glass or metal. For optimum benefits, a content not exceeding 15% is preferred.

The waterproofing and resistance to weathering characteristics of the present mixtures can be enhanced by using a waterproofed, quick setting material as the crystalline hydraulic cement component. A specific example of such material is that sold under the mark Waterplug® by Standard Dry Wall Products Co., New Eagle, Pa. However, caution must be used in such substitutions, because there may be a sacrifice of crushing strength in the resulting composite.

In preparing the present mixtures, a quantity of the selected silicate glass is ground, or otherwise comminuted, to pass through a −140 mesh screen (<105 microns). This glass powder is then mixed with the proper amount of a premixed cement composed primarily of Portland cement and ready for use. The glass-crystalline cement mixture is blended into the aqueous quaternary ammonium silicate to yield a thixotropic suspension. The mix is then ready to apply, the application technique depending on the article involved. Thus, where spot application is involved, as in a vacuum bottle, any applicator ejecting a small gob may be satisfactory. Where a panel is to be coated on its back, rolling or spreading procedures will be employed. For applying inside a band, as on a tube wall, a continuous injection application will normally be preferred.

The cement mixture can be air cured at room temperature in 24 to 48 hours; or cured by heating to 150°–175° F for 15–30 minutes. These curing times are much faster than normal setting times for concrete. They are of course a function of the hydration of the glass powders and hence dependent not only on temperature but on amount of water available. As noted earlier the silicate solution supplies the water and hence operates as a control. Water can be added in excess, as explained later, but this generally results in an inferior product and is undesirable.

Once cured, the mix may be foamed by suddenly increasing the temperature. While a sudden increase below 150° C. will cause foaming, any firing above this temperature will suffice. The essential condition is to release water of hydration or excess adsorbed water to cause bloating or expansion of the mix. We find that an expansion of about three fold provides an optimum combination of strength, thermal insulation and crushing strength and that over about five fold causes a precipitous drop in foam strength.

Alternatively, the foaming step may be simultaneous with another heat treating operation wherein a seal is formed with a frit sealing glass. For example, the foaming cement of this invention can be applied between the skirt surface on a television tube and a metal band enclosure for implosion purposes. Also, a frit sealing glass can be applied between the opposed sealing surfaces of the panel and funnel to unite these members when the frit glass is thermally softened. We have found that the frit glass sealing cycle, which may be 435° C. for 10 to 30 minutes, is also satisfactory for foaming the cement mixture in place between the tube wall and the metal band.

Also, for many applications microwave heating may be convenient. In such case an air dried cement was foamed in approximately one minute in a commercial microwave oven (700 watts output).

THE DRAWING

The single FIGURE in the drawing is a view in cross-section of a vacuum bottle produced in accordance with, and illustrating a preferred embodiment of, the invention.

SPECIFIC DESCRIPTION

Referring to the drawing, a vacuum bottle 10 is shown in cross section consisting of an inner glass tubular container 12 integrally joined at its upper end 14 to a corresponding outer glass tubular member 16 which fits snugly into a metal or plastic can or carrier 18. Intermediate tubular glass members 12 and 16 is an evacuated space 20 which provides the insulating effect.

It is readily apparent that tubular members 12 and 16 are extremely susceptible to damage by mechanical shock unless properly spaced from one another and relatively firmly supported in such spaced relation. Heretofore, asbestos plugs have been used in a manner shown for example in U.S. Pat. No. 888,783 granted May 26, 1908 to R. Burger. A settable cement was proposed in U.S. Pat. No. 1,498,837 granted June 24, 1924 to A. G. Hale, but it is not known that such expedient was ever commercially adopted.

In accordance with our present invention, suitable quantities of the prepared thixotropic cement mixture were placed at spaced locations midway up the wall of tubular member 16 before assembly. These applications were air cured, the tubular parts joined, and the assembly placed in a microwave oven for about one minute. This caused the applied spots of mixture to foam to three to four times their size, thus filling the space between walls of members 12 and 16 to provide relatively rigid support members as shown at 22 in the drawing. The foams have low thermal conductivity and thus do not provide a heat sink for heat flow in or out of the central glass tube. This maintains the insulating property of the vacuum bottle.

For purposes of illustration, foamed supports are shown on opposite sides of bottle 10. However, the usual procedure will be to provide three equally spaced supports. It will be appreciated that this number may be increased on a larger vessel, and that the locations may either be changed or added to as desired.

The fast setting $R_2O$—$P_2O_5$—$SiO_2$ glasses disclosed in U.S. Pat. No. 3,720,527 are generally satisfactory for present purposes, and reference is made to the patent for further information on glass properties and preparation. Table I below sets forth the formulated compositions, in weight percent on an oxide basis, for several glasses that have been used.

TABLE I

|  | 1 | 2 | 3 | 4 |
|---|---|---|---|---|
| $SiO_2$ | 65 | 59.5 | 64.5 | 61.9 |
| $K_2O$ | 30 | 29.2 | 30.2 | 27.3 |
| $P_2O_5$ | 5 | 7.3 | 3.8 | 3.7 |
| CaO | — | 4.0 | — | — |
| MgO | — | — | 1.5 | — |
| SrO | — | — | — | 7.2 |

Also, the quaternary ammonium silicates are generally useful. A material available from Philadelphia Quartz Co. under the trademark QURAM is #3365 which contains 24.6% by weight total solids (20% $SiO_2$ and 2.2% total alkali). This material has a density at 20° C. of 9.80 lbs./gal.; a specific gravity of 1.18; and a pH at 25° C. of 11.3. Another material from the same source, QURAM XR-70, has the same properties and composition, but has a 2.5% addition of iron oxide pigment.

Table II below sets forth, in terms of weight percent, several mixtures of differing proportions made up from glass #2 of Table I; a premixed cement available under the trademark SAKRETE; and a quaternary ammonium silicate available under the mark QURAM 3365.

TABLE II

|  | 1 | 2 | 3 | 4 | 5 |
|---|---|---|---|---|---|
| Cement | 10 | 35 | 20 | 35 | 10 |
| Glass powder | 25 | 25 | 35 | 40 | 10 |
| QURAM 3365 | 65 | 40 | 45 | 25 | 80 |

Composition 1 provided a thixotropic mix that set up in about 30 minutes, that was self curing, and that formed an excellent cement. Composition 2 in contrast formed only granulated particles because of the high Portland cement content. Composition 3 represents essentially the limit or margin of the present mixtures. It forms a hard cement having good strength characteristics, but the relatively high content of both crystalline and glass cements makes it very difficult to work. Thus, it sets up in about five minutes, leaving very little time to mix and work. This is characteristic of mixtures having high total cement contents, that is on the order of 50% and greater.

Composition 4, because of the low aqueous silicate level failed to form a cement at all. This situation could be remedied by adding 30 weight percent water, but the resulting cement had poor weathering characteristics. Composition 5 forms a good self curing cement, but has insufficient glass to appreciably modify the curing properties of an all-silicate cement. Thus, it required over 24 hours to cure in contrast to the mixture of example 1.

The increased strength of cements produced in accordance with the present invention, as compared to prior known silicate cements, is shown in Table III wherein properties measured on the cement mixture of Example 1 in Table II are compared with those measured on a silicate cement prepared from the quaternary ammonium silicate alone (QAS). Measurements were made on cured, but unfoamed, cements, and also on duplicate samples which were foamed to about four fold by heating.

TABLE III

|  | Unfoamed | | Foamed | |
|---|---|---|---|---|
|  | 1 | QAS | 1 | QAS |
| Flexural strength (psi) | 3500 | 1700 | 2300 | 800 |
| Flexural Modulus ($\times 10^6$ psi) | 1.7 | 0.7 | 1.4 | 0.2 |
| Charpy Impact Test (lbs./in.$^2$) | 7.2 | 2.1 | 4.2 | <1.0 |

In addition to having good initial strength, the present compositions tend to retain such strength values over extended times. For example, cured, unfoamed test pieces were produced from the mixtures illustrated by compositions 1, 3 and 5 of Table II. These were tested for flexural strength in psi and flexural modulus ($\times 10^6$) in psi. After six weeks storage at 70°-72° F. and 40-60% relative humidity, the measurements were repeated. The measurements are recorded in Table IV below.

TABLE IV

|  | As Cured | | |
|---|---|---|---|
|  | 1 | 3 | 5 |
| Flexural Strength | 3500 | 3700 | 3700 |

TABLE IV-continued

| | | | |
|---|---|---|---|
| (psi) Flexural Modulus ($\times 10^6$ psi) | 1.7 | 1.7 | 1.6 |
| | | After Storage | |
| Flexural Strength | 3250 | 3500 | 2400 |
| Flexural Modulus | 1.6 | 1.5 | 1.0 |

A cylindrical plug was molded from each of compositions 1 and 5. The plugs were cured and then foamed to approximately four times original size, the foamed plugs being about one inch in diameter and two inches in height. The foamed plugs were immersed in water for six weeks. At the end of this time, the plug corresponding to composition 5 had disintegrated into friable pieces. The plug corresponding to composition 1 had appreciably less strength, but still did not crush under manual pressure.

Thus the present invention provides a unique cement mixture that may be foamed, that cures in a practical time, that resists disintegration by moisture, and that has relatively good mechanical strength.

We claim:

1. An inorganic cement mixture, capable of being foamed, and consisting essentially of, in percent by weight, 8–20% crystalline hydraulic cement, 22–35% of a hydraulic cement in the form of a silicate glass powder, and 45–70% of quaternary ammonium silicate solution.

2. An inorganic cement mixture in accordance with claim 1 wherein the crystalline hydraulic cement component is a premixed cement composed predominantly of Portland cement.

3. An inorganic cement mixture in accordance with claim 1 wherein the total hydraulic cement content does not exceed 50%.

4. An inorganic cement mixture in accordance with claim 1 wherein the crystalline hydraulic cement content does not exceed 15%, the silicate glass hydraulic cement content does not exceed 30%, and the quaternary ammonium silicate solution is at least 55% of the mixture.

5. An inorganic cement mixture in accordance with claim 1 wherein the crystalline hydraulic cement content is about 10%, the glass powder content is about 25% and the quaternary ammonium silicate solution is about 65%.

6. A method of forming an inorganic cement body which comprises forming a thixotropic mixture consisting essentially of, in percent by weight, 8–20% crystalline hydraulic cement, 22–35% of a hydraulic cement in the form of a silicate glass powder, and 45–70% of quaternary ammonium silicate, and allowing the mixture to react and set at a temperature below 150° C.

7. A method in accordance with claim 6 wherein the set mixture is heated at a temperature sufficient to expand the mass to not more than five fold to form a foamed cement.